March 24, 1936.  J. G. WALLNY  2,034,784
APPARATUS FOR FILTERING AND WASHING MIXTURES
OF SOLID AND LIQUID SUBSTANCES
Filed Aug. 9, 1933
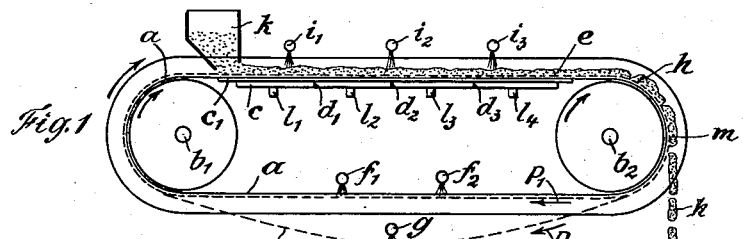
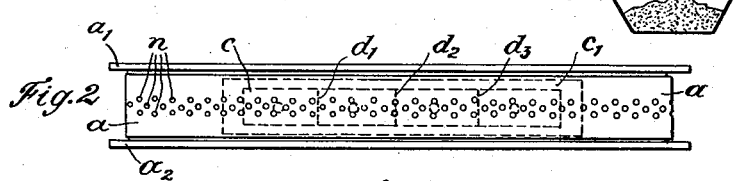
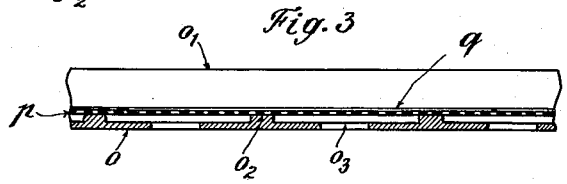
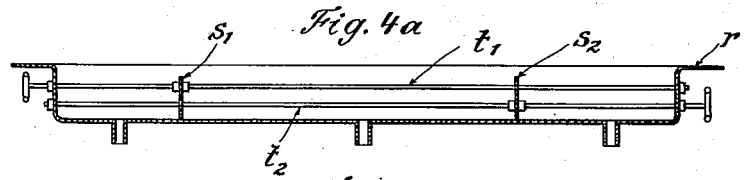
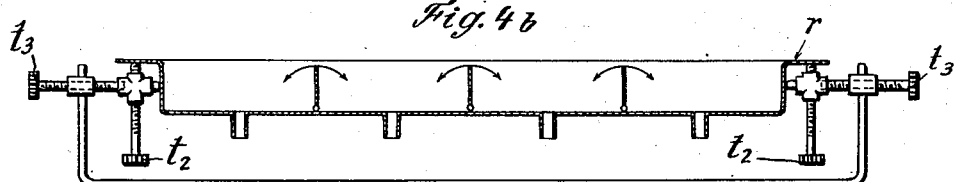
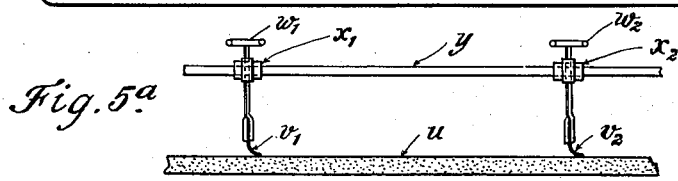
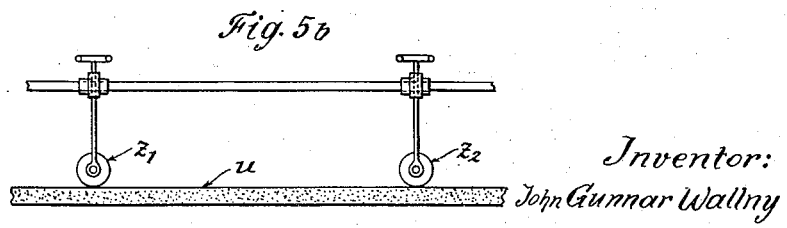
Inventor:
John Gunnar Wallny
By A. M. Weller
Attorney Patented Mar. 24, 1936

2,034,784

UNITED STATES PATENT OFFICE 2,034,784

APPARATUS FOR FILTERING AND WASHING MIXTURES OF SOLID AND LIQUID SUBSTANCES

John Gunnar Wallny, Landskrona, Sweden, assignor to Aktiebolaget Kemiska Patenter, Landskrona, Sweden Application August 9, 1933, Serial No. 684,367
In Germany September 6, 1932

3 Claims. (Cl. 210—197)

The separation of mixtures of solid and liquid substances and the washing of the solid material on horizontally disposed filter surfaces offers the particular advantage over operating with differently constructed apparatus, particularly drum filters, that the force of gravity is utilized and the formation of the filter cake thereby takes place more or less automatically, whilst, for example, in the case of a drum filter, the cake has first to be formed by the suctional power of a vacuum acting against the force of gravity. A further advantage of such horizontally disposed apparatus consists therein that filter cakes of any desired thickness can be directly obtained therewith, whereas, for example, in the case of drum filters, particularly if difficultly filtrable sludges have to be worked up, only comparatively thin cakes can be produced.

These advantages of filtering on horizontal filter surfaces are, however, counteracted in the apparatus hitherto employed in the technique, such as suction filter beds, filter boxes or so-called rotary filter tables, by a number of disadvantages, which reduce the practical utility of the apparatus in other directions or more or less negative the above-mentioned advantages. Thus, for example, the suction filter beds and filter boxes mentioned above must either be emptied by hand after each operation or, in order to remove the cake and thus render the operation automatic, be tilted through an angle of 180 degrees after each individual batch has been treated, whereupon they must be again restored to their previous position. Both processes, therefore, do not allow of continuous operation and require a comparatively large amount of manual labour and superintending during working. The rotary filter tables on the other hand, owing to the subdivision of the solution, require automatic control valves and the blowing off of the filter cake as well as more or less complicated devices for removing the latter from the filter surface, whereby in this case also the whole operation is rendered expensive and difficult.

The present invention renders it possible readily to effect thorough and absolutely continuous filtration and washing on horizontal filter surfaces without the requirement of any manual labour, the use of automatic control valves and complicated removing apparatus and without any of the other disadvantages attending the hitherto known processes. This is effected according to the present invention by carrying out the filtration and washing of the mixtures of solid and liquid substances on a horizontally travelling endless carrier belt of elastic material, for example rubber, which is provided with apertures and covered with a suitable filtering medium, for example filter cloth, and is conveyed over one or more evacuated suction boxes open to the said belt without any special tightening device. The filtrates are sucked either jointly or separately into the suction box or boxes, whilst the filter cake formed on the filtering medium when passing over the suction box or boxes is lifted off from the said filtering medium or with advantage by own weight thrown off therefrom during the return passage of the endless carrier belt. The latter operation can be very simply effected, for example by passing the endless carrier belt over two or more rollers so that, after passing the suction box or boxes, the carrier band and the filtering medium disposed thereon are automatically reversed and thus cause the filter cake to be thrown off. In this way special removing devices, such as knives, rollers, blowing apparatus or the like, are entirely dispensed with.

It has been found particularly advantageous to provide the carrier belt with raised edges between which the filtering material and, if necessary, an intermediate belt run. The material to be filtered is thus prevented from escaping at the sides and the level of the washing solutions over the filter cakes can be maintained at different heights.

Since in such an operation according to the invention the feed of the fresh mass and washing liquid can also be effected uninterruptedly and without the necessity of manual labour, it is possible to carry out the whole process continuously. The formation of cracks, which otherwise readily appear in the filter cake on washing, can also be easily entirely avoided thereby, since it is possible without any further precautions, for example by suitably arranging the feed of the washing solutions, to keep the filter cake constantly covered with liquid and there are also no further difficulties in the way of observing the entire filtering and washing process at each stage.

The washing of the filter cake can easily be effected by disposing above the portions of the endless carrier belt opposite to the suction-boxes, nozzles or other means for feeding the washing liquid, which nozzle or other means may if desired be displaceable.

If it is desired to employ washing liquids of different concentrations, these can be easily separated on the surface of the material to be treated by slidable partitions which are provided with resilient edges or by employing cylinders for this purpose. In this manner it is possible to carry out the washing operation with the maximum degree of accuracy and positively avoiding the formation of any cracks or crevices in the filter cakes, which was hitherto impossible with any other continuously operating filtering apparatus.

When operating according to the invention it is particularly surprising that it is thereby possible to convey the elastic carrier belt over the suction box or boxes at a speed, which is preferably slow and capable of regulation, without there being any appreciable or practically important loss in vacuum, i. e. the vacuum prevailing in the suction boxes remaining at the same value whilst the elastic carrier belt covered with the material to be filtered passes thereover. It is particularly advantageous in this connection to provide the suction box or boxes with a special, preferably highly polished, supporting edge or rim, for example of hard rubber or metal, which enables the travelling carrier belt to cling very tightly thereto, thus providing a very efficient seal. Contrary to expectations it has been found possible to dispense with special means for tightening the belt against the rims of the suction box.

Between the elastic carrier belt and the filtering medium or filter cloth, consisting for example of wool, cotton, silk or the like, there can be disposed a further separate, and likewise elastic, endless belt which is porous or perforated or maintained vertically permeable in another manner or is provided with grooves or channels or the like, so that hollow spaces, which enable the liquid to pass through, are formed or are present between the same and the endless carrier belt. This intermediate belt may also consist, for example, of rubber having a degree of hardness approximately equal to that of pneumatic rubber, or of other suitable elastic material of sufficient strength, provided for example with strengthening insertions of fabric or the like, rubber being for the present purpose a particularly suitable material especially if acid solutions have to be treated. In this connection porous rubber bands have also proved to be very serviceable as a filtering medium.

Ledges or channels are preferably provided on the surface of the carrier belt itself, the intermediate belt being smooth on both sides, so that hollow spaces or cells are formed under the same.

According to the present invention it is also readily possible, without employing special complicated apparatus or even without interrupting the whole operation, to wash the filtering medium disposed on the carrier belt or the intermediate belt. This can be effected in a very simple manner for example by washing the same with water or other suitable liquids during the return passage of the endless carrier belt. This water or other washing liquid can be sprayed on the back of the carrier belt or against the filtering medium itself. An alternative procedure, however, is, for example, to maintain the filtering medium, constructed in the form of an endless belt, of greater length than the carrier belt and intermediate belt, if such be provided, and to wash the said filtering medium on its return passage separately from the carrier belt and the intermediate belt.

It is also in certain circumstances advantageous when employing an intermediate belt disposed between the filtering medium and the carrier belt, to maintain the said intermediate belt longer than the carrier belt but shorter than the filtering medium so that, if desired, this intermediate belt also can be conveniently separately washed.

A very substantial advantage of the invention is furthermore the opportunity offered thereby of changing the filter cloth whilst in operation and without interrupting the same. This opportunity is not afforded by any of the hitherto known filter constructions and in the process and apparatus according to the present invention comprises a very particular technical advance. As soon as it is desired to change the filter cloth for any reason it is cut through during its return passage and the new cloth attached to the travelling end of the old cloth. In this manner the new cloth is automatically drawn over the suction box or boxes and beneath the filter cake. After the front end of the new cloth has passed the suction box or boxes and is on its return passage it is separated from the old cloth and fastened to the rear end of the new cloth. The speed of rotation should be so regulated thereby that this operation can easily be effected without interrupting the operation.

Fig. 1 is a diagrammatic side view of an embodiment of the present invention;

Fig. 2 illustrates a fragmentary top plan view of the belt and suction box;

Fig. 3 depicts a fragmentary sectional side view of the carrier belt with an intermediate belt and filtering medium thereon;

Fig. 4a is a sectional view of the suction box illustrating the means for regulating the size of the suction box divisions;

Fig. 4b depicts another sectional view of a suction box having adjustable means at the sides thereof;

Fig. 5a shows arrangements for adjusting the washing liquids above the filter cake; and Fig. 5b illustrates a modification of Fig. 5a.

A suitable embodiment of the apparatus according to this invention is diagrammatically illustrated in the accompanying drawing, wherein in Figs. 1 and 2:—

$a$ represents an endless elastic carrier belt, for example of rubber, which is provided with apertures and raised edges of the same elastic material and is conveyed horizontally in the direction of the arrows over the rollers $b_1$ and $b_2$, at least one of which is connected with suitable driving means. $c$ represents the suction box having polished edges or rims $c_1$, over which the travelling belt passes and automatically fits tight against the said suction box. $e$ is a filter cloth disposed on the endless carrier belt $a$ and also constructed in the form of an endless belt, which travels at the same speed as the elastic carrier belt, against which it is sucked tight during its passage over the suction box.

A perforated intermediate belt can advantageously be disposed between the carrier belt and the filtering cloth, which intermediate belt forms cells or hollow spaces on the surface of the carrier belt. A uniform distribution of the vacuum under the filtering medium and an excellent tightening against vacuum losses over the sides of the suction box are thus assured.

The return passage of the filter cloth or belt $e$ can either take place in the direction of the arrow $P_1$ or in spatial separation from the belt $a$ for example in the direction of the arrow $P_2$. In the former case the filter belt also lies close against the carrier belt or intermediate belt during the return passage and washing may be effected either for example with the aid of the nozzles $f_1$ and $f_2$ or alternatively from below. In the alternative case, however, which in general is the most advantageous, the longer filter belt or cloth $e$ in this lower portion of the whole apparatus travels separately from the carrier belt $a$ and can thus be washed directly from above, for example with the aid of the nozzle $g$.

The formation of the filter cake $h$ takes place in the part of the filter belt above the suction box, the mass to be filtered or washed being introduced at $k$. The washing of the filter cake, if desired in individual washing fractions, is effected for example with the aid of the nozzles $i_1$ to $i_3$. The primary filtrate and if desired the individual washing filtrates are sucked out of the filter box, for example through the connections $l_1$ to $l_4$. The completely washed filter cake is automatically thrown off at $m$. $n$ are the holes or apertures in the elastic carrier belt $a$, which, as shown in the drawing, are with advantage only disposed within the inner rubbing portion of the same, which passes over the inner space of the suction box $c$.

The elastic carrier belt is with advantage provided with high edges $a_1$ and $a_2$, inside of which the filtering medium and, if desired, the intermediate belt are disposed and which can entirely or partially contain the filter cake.

According to a particular modification the suction box $c$ can also be provided with transverse partition walls $d_1$ to $d_3$, which are with advantage displaceable or are capable of rotating on a hinge, for example in such a way that they can be brought by a simple external turning movement into a vertical or horizontal position and which thus enable the duration of the washing periods to be regulated as desired. Out of each of the so formed chambers open at the top, the liquid sucked out of the filter cake can be removed by separate conduits, for example $l_1$ to $l_4$. This possibility of subdividing the individual filtrates or washing fractions entirely automatically and, if desired, also during operation without the use of a special control valve whereby the individual washing and suction periods can be made longer or shorter, which is, for example, very desirable in the case of a variable filtering material, renders the process considerably simpler than those carried out in cell filters, which cannot operate at all without a complicated control valve. This advantage is of particular importance when treating aggressive liquids since in such cases automatic valves, owing to their becoming worn out or stopped up or corroded, rapidly give rise to disturbances in operation of the most unpleasant nature.

It has further proved to be particularly advantageous so to arrange the suction boxes that they are movable in a vertical plane. The suction boxes can thereby readily follow any small alterations in the position of the travelling belt, whereby still greater security in maintaining the vacuum is obtained. The suction boxes can also be so disposed that they are movable or displaceable in a horizontal plane. The possibility afforded thereby of displacing the suction box in the longitudinal axis of the travelling belt offers the advantage of enabling a correction of the concentration of the individual filtrates to be effected in a particularly convenient manner. The hereinbefore mentioned intermediate partition walls within the suction boxes can accordingly also be replaced or their function be supplemented in an advantageous manner.

Finally the space above that portion of the filled endless carrier belt which passes over the suction box can also be subdivided, by disposing, for example between the individual nozzles $i_1$ to $i_3$, members slipping or rolling on the surface of the filter cake formed, for example partition walls, such as metal sheets, rubber plates etc., rollers or the like, and in this way the individual washing liquors be kept separate from one another and the filter cake be washed with separate individual washing fractions.

In Figs. 3 to 5 several of the above described forms of construction are shown in detail.

Fig. 3 is a cross section through the carrier belt $o$ with the vertically porous intermediate belt $p$ and the filtering medium $q$ proper placed thereon. $o_1$ designates the raised edge of the carrier belt, $o_2$ the bars on the surface of the belt proper and $o_3$ the holes in the carrier belt which run over the suction box aperture.

Figs. 4$a$ and 4$b$ show a cross section through the suction box in which figures the adjustable arrangement for the regulation of the filtrate fractions can be seen.

In both figures $r$ designates the upper smooth edge of the suction box. In Fig. 4$a$ partitions $s_1$ and $s_2$ shiftable in a horizontal plane are provided with screw threads engaging spindles $t_1$ and $t_2$ by means of which they can be shifted to the right and left. These two spindles extend through lateral walls of the suction box and tightly fitting therein, and are actuated by hand wheels.

Fig. 4$b$ shows a regulating arrangement for the fractions in the form of regulating flaps, the pivot axles of which extend tightly through one of the longitudinal walls of the suction box and can be adjusted at different angles to the horizontal plane from the outer side by means of a tommy screw or hand wheel. Thus, the individual fractions can be shortened or lengthened.

In Fig. 4$b$, a further embodiment is illustrated which permits the suction box to be displaced in a vertical and horizontal direction by means of the adjusting screws $t_2$ and $t_3$. By merely adjusting the screws, a simple adjustment of the elastic belt against the suction box is attained. In this manner, a tight suction fit is assured between the belt and the box.

Figs. 5$a$ and 5$b$ show arrangements for adjusting the washing liquids above the filter cake $u$. In Fig. 5$a$ the arrangement comprises bars arranged transversely over the entire surface of the filter cake up to the edges of the carrier belt and carrying underneath rubber $r$ cloth bands $v_1$ or $v_2$ which brush against the upper surface of the filter cake. These bars are vertically adjustable by means of the spindles $w_1$ and $w_2$ and are movably guided by sleeves $x_1$ and $x_2$ on the rod $y$. By adjusting these sleeves on the shaft it is possible to horizontally shift the whole arrangement and consequently lengthen or shorten the individual washing sections.

Fig. 5$b$ shows a corresponding arrangement but herein the rubber or cloth bands $v_1$ and $v_2$ are replaced by cylinders $z_1$ and $z_2$.

I claim:—

1. A filtering device for filtering and washing mixtures of solid and liquid substances comprising in combination a horizontally travelling endless carrier belt of elastic material having apertures, an integral, upwardly projecting flange on each edge, a smooth under face, and ledges and channels associated with its upper face, an intermediate, foraminous endless belt having smooth surfaces carried by the ledges on said carrier belt and forming hollow spaces and cells therewith; and a filtering medium in the form of an endless belt of pliable, porous cloth carried by said intermediate belt and adapted to prevent loss of suction through lateral leakage, a pair of rollers supporting said belts; and at least one suction box located underneath said carrier belt extending between said rollers and having an opening towards the smooth under-surface of said carrier belt.

2. A filtering device which comprises a horizontally travelling endless carrier belt of elastic material having a smooth inner surface and apertures and an integral, upwardly projecting flange on each edge, a filtering medium in the form of an endless belt on said carrier belt, a pair of rollers for supporting said belts, at least one suction box of accentuated length, having an opening facing the smooth surface of said carrier belt along the full length thereof between said rollers, smooth horizontal bearing edges around said opening forming a seal with said carrier belt automatically closing said box, displaceable transverse partition walls in said box dividing same into a plurality of compartments, means for displacing said partitions in the direction of movement of said belt whereby the length of said compartments and the quantity and the concentration of the filtrates obtained in said compartments can be adjusted.

3. A filtering device which comprises a horizontally travelling endless carrier belt of elastic material having a smooth inner surface and apertures and an integral, upwardly projecting flange on each edge, a filtering medium in the form of an endless belt on said carrier belt, a pair of rollers for supporting said belts, at least one suction box of accentuated length, having an opening facing the smooth surface of said carrier belt along the full length thereof between said rollers, smooth bearing edges around said opening forming a seal with said carrier belt automatically closing said box, and transverse partition walls hingedly mounted in said suction box dividing same into a plurality of compartments, means for varying the angle of said partitions with respect to the direction of movement of said belts, the length of said compartments and the quantity and concentration of the filtrates obtained in said compartments being varied when said angle is varied.

JOHN GUNNAR WALLNY.